US006847607B1

(12) United States Patent
Kasdan (10) Patent No.: US 6,847,607 B1
(45) Date of Patent: Jan. 25, 2005

(54) AUTOMATIC PROVISIONING OF PROTECTION CIRCUITS IN A COMMUNICATIONS NETWORK

(75) Inventor: John Martin Kasdan, Wallingford, CT (US)

(73) Assignee: Sirocco Systems, Inc., Wallingford, CT (US)

( * ) Notice: Subject to any disclaimer, the term of this patent is extended or adjusted under 35 U.S.C. 154(b) by 672 days.

(21) Appl. No.: 09/586,181

(22) Filed: Jun. 1, 2000

(51) Int. Cl.[7] .............................................. H04L 12/56
(52) U.S. Cl. ..................... 370/225; 370/228
(58) Field of Search ........................... 370/238.1, 217, 370/227, 218, 219, 225, 827

(56) References Cited

U.S. PATENT DOCUMENTS

| | | | | |
|---|---|---|---|---|
| 5,649,108 A | * | 7/1997 | Spiegel et al. | |
| 5,712,847 A | * | 1/1998 | Hata | 370/228 |
| 5,717,796 A | * | 2/1998 | Clendening | 385/24 |
| 5,838,924 A | * | 11/1998 | Andersen et al. | 395/200.65 |
| 5,870,382 A | * | 2/1999 | Tounai et al. | 370/220 |
| 5,940,372 A | | 8/1999 | Bertin et al. | |
| 5,946,295 A | | 8/1999 | Sofman et al. | |
| 6,044,075 A | | 3/2000 | Le Boudec et al. | |
| 6,353,593 B1 | * | 3/2002 | Chen et al. | 370/216 |
| 6,359,857 B1 | * | 3/2002 | Ahmad et al. | 370/217 |

* cited by examiner

Primary Examiner—Kenneth Vanderpuye
(74) Attorney, Agent, or Firm—Lahive & Cockfield, LLP (57) ABSTRACT

Techniques for establishing communications include automatically provisioning a primary circuit for communications between a first node and a second node in a communications network, and automatically provisioning a protection circuit for communications between the first node and the second node. The circuits can be provisioned in response to receiving a request to establish communications between the first and second nodes, and the sum of administrative weights of all links forming the primary and protection circuits can be minimized with respect to available links. The techniques can provide quick and efficient provisioning of the circuits on an as-needed basis.

25 Claims, 8 Drawing Sheets

AUTOMATIC PROVISIONING OF PROTECTION CIRCUITS IN A COMMUNICATIONS NETWORK

BACKGROUND

The invention relates to the automatic provisioning of protection circuits in a communications network.

Communications networks typically include various switches and access devices, collectively referred to as nodes or network elements. The network elements are interconnected by transmission facilities such as electrical or optical links. For example, electrical cables can be used to provide electrical paths or optical fibers can be used to provide optical paths. In most networks, a node is connected directly to only a few other nodes that often are geographically close to it.

Communications can be sent from a source node to a destination node. To facilitate the transfer of data or other communications between the source and destination nodes, a route is provided between them. A user located at the source node typically requests immediate provision of a route to the destination node. The assigned route can include one or more links. Typically, there are many possible routes between any two nodes. Each such route passes through a different set of intermediate nodes and, therefore, includes a different combination of links. Such a route is sometimes referred to as a circuit.

Some communications systems, such as existing telephone systems, can automatically compute a route through the network and set up a 56 kilobit per second (Kbit/sec) DS-0 voice circuit. For larger capacity circuits, the Asynchronous Transport Mode (ATM) protocol allows for the automatic provisioning of Soft Permanent Virtual Circuits. However, for higher capacity circuits, such as the OC-1 through OC-192 Synchronous Optical Network (SONET) channels, establishing a circuit is normally done manually.

One problem encountered in communications networks is that they are subject to disruption. A common form of disruption is the breaking of network links. Falling trees, for example, are one cause of failure of overhead wires. Similarly, careless excavation can result in the breakage of buried optical fibers. Therefore, it often is desirable to provide protection circuits in a network. A protection circuit provides an alternate route from the beginning point to the end point of a circuit and preferably shares no links with the primary circuit. In case of disruption of the primary circuit, traffic can be redirected over the protection path.

In some known implementations, networks are built as rings or as a series of rings bridged together. A primary path from one node to another goes one way around the ring and the protection path goes the other way. As more fiber is put in place, network elements are connected by links that produce a sparse mesh, rather than structured rings. Furthermore, using ring protection results in one-half of the available bandwidth being dedicated to protection. Although that may be acceptable for important traffic, there is other traffic, such as traffic that is not time-sensitive and which can be re-sent if necessary, for which the expense of protection is not warranted.

Therefore, it is desirable to be able to provision protection circuits when, but only when, they are needed. Furthermore, it would be desirable if such provisioning could be performed quickly when the primary circuit is requested.

SUMMARY

In general, techniques for establishing communications include automatically provisioning a primary circuit for communications between a first node and a second node in a communications network, and automatically provisioning a protection circuit for communications between the first node and the second node.

In various implementations, one or more of the following features may be present. The primary and protection circuits can be provisioned in response to receiving a request to establish communications between the first and second nodes, and the sum of administrative weights of all links forming the primary and protection circuits can be minimized with respect to available links. The links in the resulting primary and protection circuits can be non-overlapping. In some cases, other than the first and second nodes, the primary and protection circuits do not share any other nodes.

The techniques can include determining a first route between the first and second nodes so that a sum of original administrative weights associated with links along the first route is minimized. An augmented network corresponding to the communications network can be established, and a second route between the first and second nodes can be determined based on the augmented network so that a sum of administrative weights associated with links along the second route is minimized. The first and second routes then can be combined to obtain first and second paths between the first and second nodes. The first and second paths can be implemented as the primary and protection circuits.

Establishing the augmented network can include assigning a new administrative weight for each link along the first route and limiting a permissible direction of communications on each link used in the first route. Each new administrative weight can have a negative value and an amplitude equal to the original administrative weight corresponding to the same link. A permissible direction of communications for each link used in the first route can be limited to a direction opposite the direction established for that link in the first route. For example, assuming the first path is implemented as the primary circuit, then if a failure occurs with respect to the primary circuit, the second path can be implemented as the protection circuit.

Systems implementing and using the foregoing techniques also are disclosed.

In various implementations, one or more of the following advantages are present. The techniques described here can be used to determine and implement primary and protection circuits at various protocol layers and for various capacities within each protocol layer in different types of protection circuit scenarios. The techniques allow automated provisioning of protection circuits for a wide variety of communications networks. Furthermore, provisioning of the circuits can be accomplished quickly and efficiently on an as-needed basis.

Additional features and advantages will be apparent from the detailed description, the accompanying drawings and the claims.

DETAILED DESCRIPTION

Figure 1:
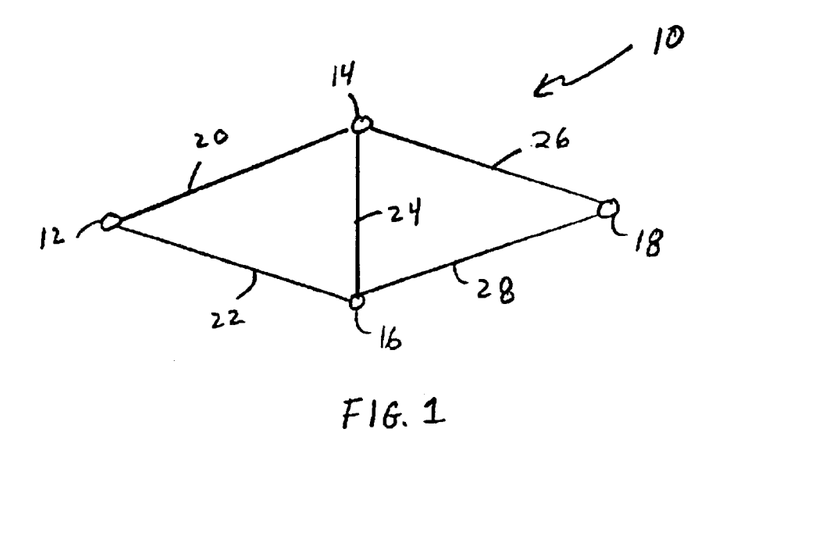
FIG. 1 illustrates an exemplary communications network in which the invention can be practiced.

As shown in FIG. 1, an exemplary communications network 10 includes multiple network elements 12, 14, 16, 18 interconnected by transmission facilities 20, 22, 24, 26, 28. Thus, for example, the transmission facility 20 provides the link between the network elements 12 and 14. Although the network 10 includes only four network elements and five links, a typical communications network may be more complex and can include many more network elements and links.

Each link 20, 22, 24, 26, 28 has a specified capacity or bandwidth for handling traffic. In general, the capacity of a particular link may vary from the capacity of other links in the network. The technique described below assumes that in determining a primary circuit and a protection circuit in response to a request for communication between any two nodes in the network 10, each link is available to be used only a single time in either the primary circuit or the protection circuit. In other words, a particular link 20, 22, 24, 26, 28 cannot be used for both the primary circuit and the protection circuit.

A respective administrative weight is associated with each link 20, 22, 24, 26, 28. Each administrative weight initially assigned to a link is a positive integer. The administrative weight assigned to a particular link can be the same as or may differ from the weights assigned to other links. In general, a high administrative weight indicates that the particular link is disfavored for use in establishing a route between nodes. The administrative weight for a particular link can be based on a variety of factors including, but not limited to, the extent to which the link has been utilized in the past, tariff fees, and/or the number of previous failures associated with the link.

Figure 2:
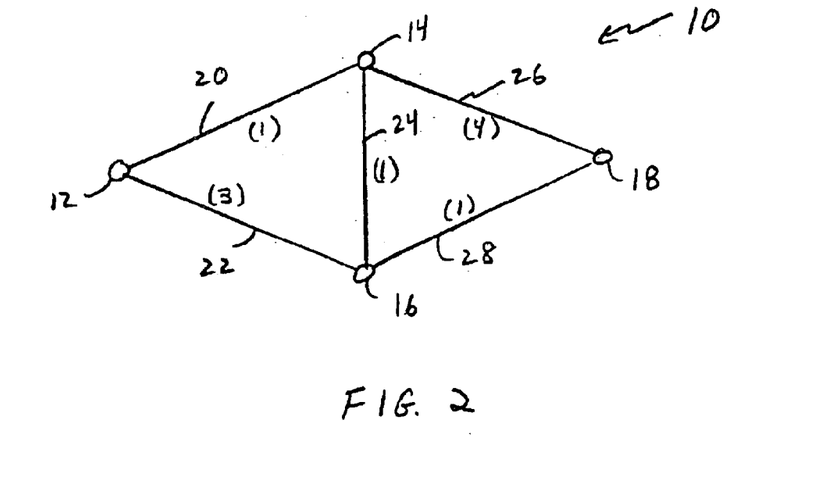
FIG. 2 indicates exemplary administrative weights associated with links in the network of FIG. 1.

FIG. 2 illustrates exemplary administrative weights assigned to the links in the network 10. In FIG. 2, the administrative weights are indicated in parentheses. Thus, for example, the link 20 is assigned an administrative weight of 1, whereas the link 22 is assigned a weight of 3.

Figure 3:
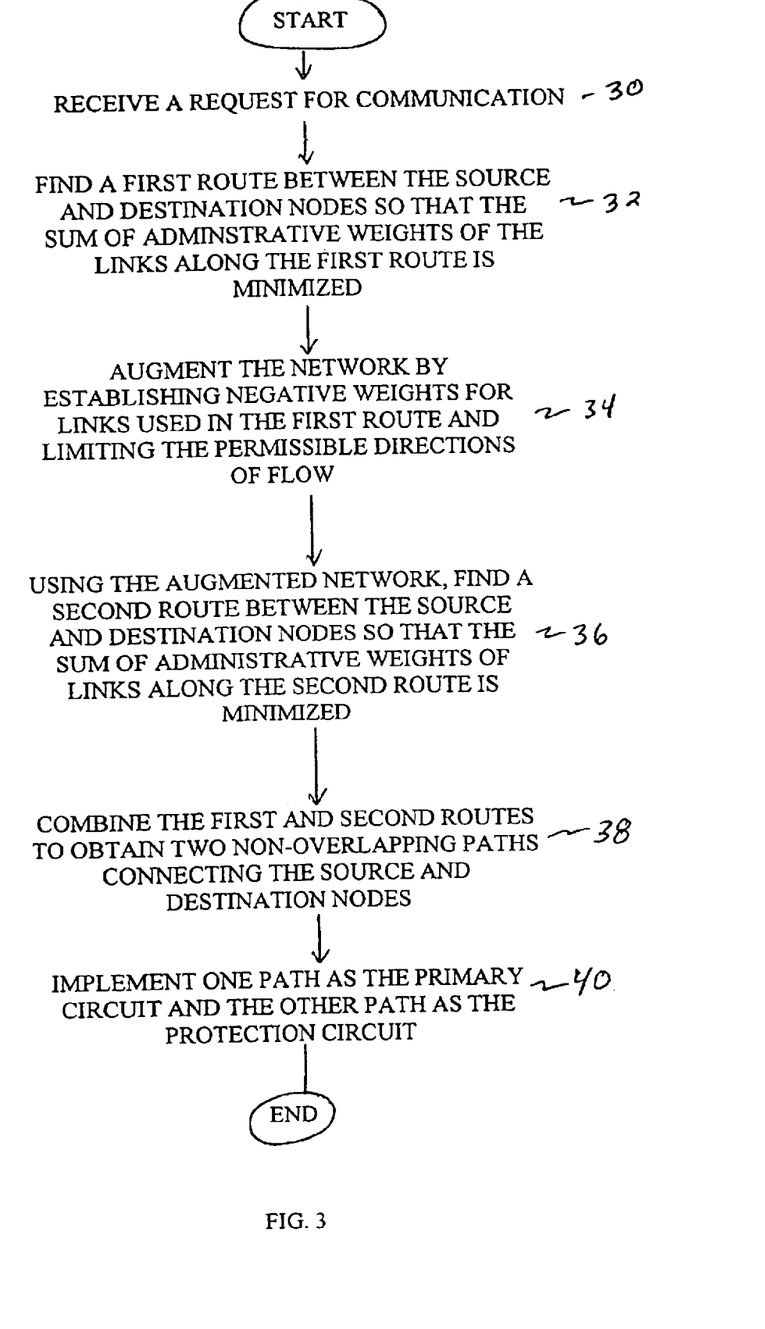
FIG. 3 is a flow chart according to a method of the invention.

As shown in FIG. 3, a request for a communication is received 30 to establish a route between a source node, for example node 12, and a destination node, for example, node 18. The request can include information specifying the bandwidth required for the requested communication. In establishing the primary and protection circuits, the technique described below considers only those network links that can support the requested bandwidth. Other links are ignored. Similarly, unavailable links, such as failed links and links that are currently in use for other communications, are ignored. In the example discussed below, it is assumed that each of the links 20, 22, 24, 26, 28 can support the requested bandwidth and are available.

As described below, in response to the received request, the technique determines a primary circuit and a protection circuit between the source and destination nodes 12, 18.

Figure 5:
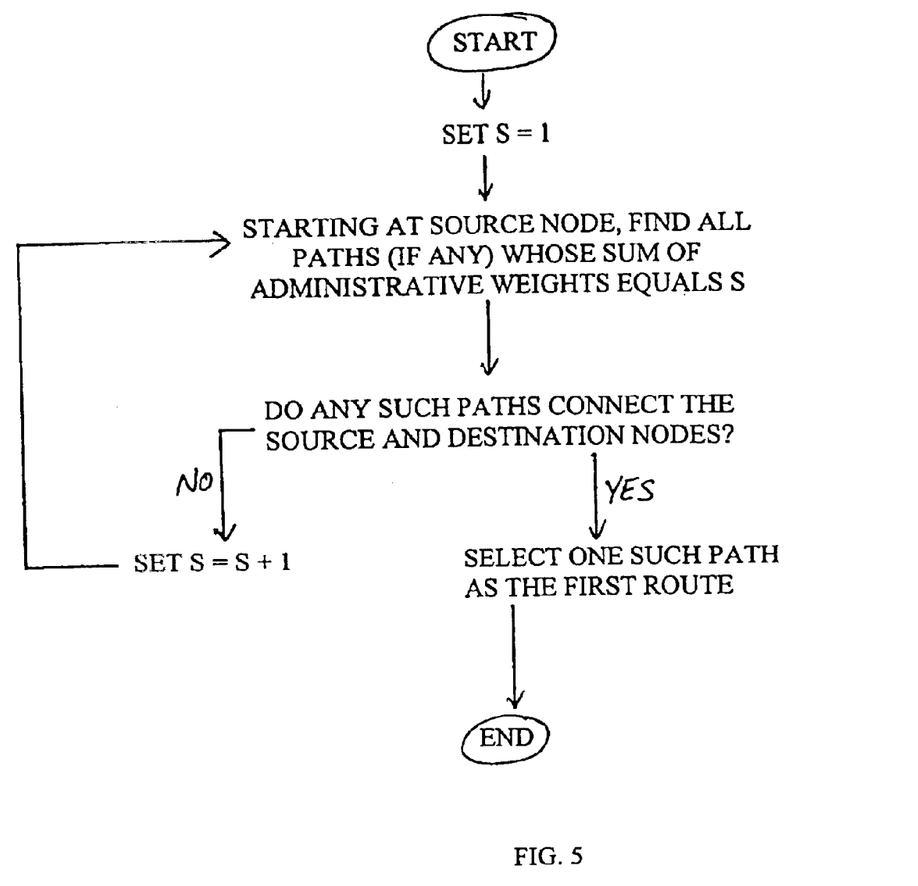
FIG. 5 is a flow chart of a technique for determining the first route.

A first route is determined by finding 32 a route from the source node 12 to the destination node 18 such that the sum of the administrative weights of the links forming the route is minimized. Various techniques can be used to obtain such a route including the Dijkstra technique, the Bellman-Ford technique or a modified version of one of those techniques. According to the Dijkstra technique (see FIG. 5), one starts from the source node 12 and determines each path (if any) for which the sum (S) of administrative weights equals 1. If a path that connects the source node 12 and the destination node 18 is obtained, then that path serves as the first route. If no path connecting the source and destination nodes is found for S equal to 1, then the value of S is increased by one and the cycle is repeated. That cycle is repeated until a path is obtained that connects the source and destination nodes 12, 18. Once a path is found that connects the source and destination nodes, that path is identified as the first route. If, for a given value of S, more than one path is found that connects the source and destination nodes, then any one of those paths can serve as the first route.

Figure 4A:
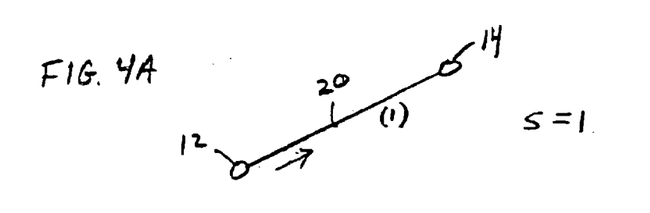
FIGS. 4A through 4D illustrate a technique for determining a first route connecting a source node and a destination node in the network.
Figure 4B:
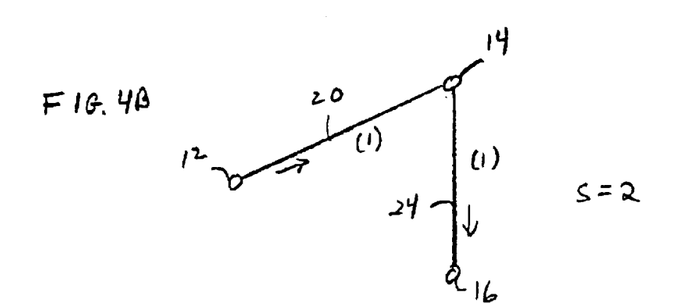
Figure 4C:
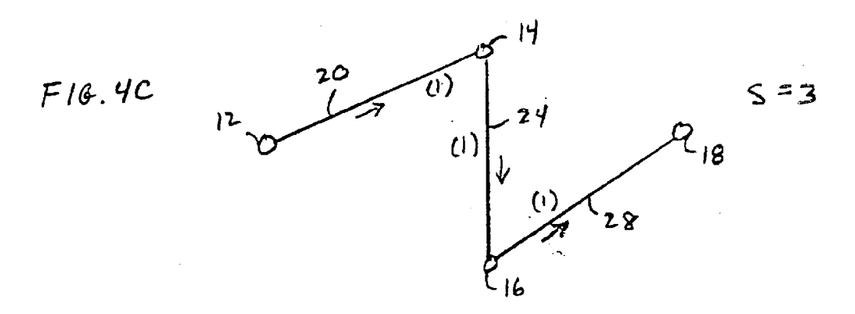
Figure 4D:
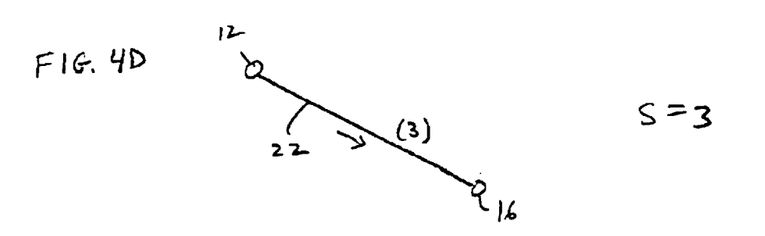

Using the example of FIG. 2, there is one path from the source node 12 for which the sum (S) of the administrative weights equals one, as shown in FIG. 4A. That path, however, does not connect the source node 12 to the destination node 18. Therefore, the value of S is increased to two. As shown in FIG. 4B, there is one path from the source node 12 whose sum (S) of administrative weights equals two. Again, that path does not connect the source and destination nodes 12, 18, and the value of S is increased to three. As shown in FIGS. 4C and 4D, there are two paths for which the sum of the administrative weights forming their respective links equals three. However, only the path in FIG. 4C connects the source and destination nodes 12, 18. Therefore, the combination of links 20, 24, 28 that form the path in FIG. 4C are designated as the first route. In FIG. 4C, arrows indicate the direction of flow of information along the links 20, 24, 28 for the first route.

Figure 6:
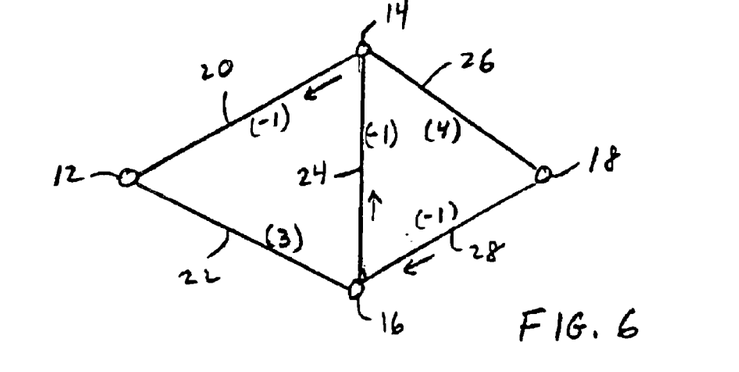
FIG. 6 illustrates an augmented network obtained from the original network and based on the first route.

Once the first route is obtained, the network is augmented by establishing new administrative weights for those links that form the first route and by limiting the permissible directions in which information may flow through the augmented network. In particular, as shown in FIG. 6, the administrative weight of each link 20, 24, 28 that forms part of the first route is set (temporarily) to a negative value having the same amplitude as its original weight. Thus, in the illustrated example, the administrative weight of each of the links 20, 24, 28 is set to negative one (−1). Additionally, the permitted direction of flow of information along each of the links 20, 24, 28 is the opposite of the direction of flow established for the first route. In FIG. 6, the permitted directions of flow for the links 20, 24, 28 are indicated by arrows. Information still can flow in either direction for the remaining links 22, 26.

Figure 7:
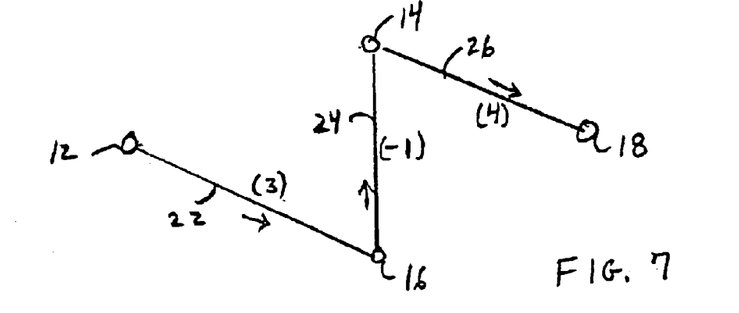
FIG. 7 illustrates a second route connecting the source node and the destination node.

Using the augmented network (FIG. 6), a second route is found (36 in FIG. 3) that connects the source and destination nodes 12, 18. The second route is determining by finding a route in the augmented network such that the sum of the administrative weights of the links forming the second route is minimized. Various techniques can be used to obtain such a route. However, the technique used to find the second route should be capable of handling negative weights and should avoid negative weight cycles. In one implementation, a version of the Bellman-Ford technique can be used to obtain the second route. If more than one path is found that connects the source and destination nodes in the augmented network and that minimizes the sum of the weights, then any one of those paths can serve as the second route. FIG. 7 illustrates the second route obtained from the augmented network of FIG. 6. In FIG. 7, arrows indicate the direction of flow of information along the links 22, 24, 26.

In some cases, it may not be possible to obtain a second route based on the augmented network of FIG. 6. In that case, a message can be generated indicating that it is not possible to provide both a primary and protection circuit for the requested communication. Under those circumstances, the request for the communication may be denied.

Figure 8:
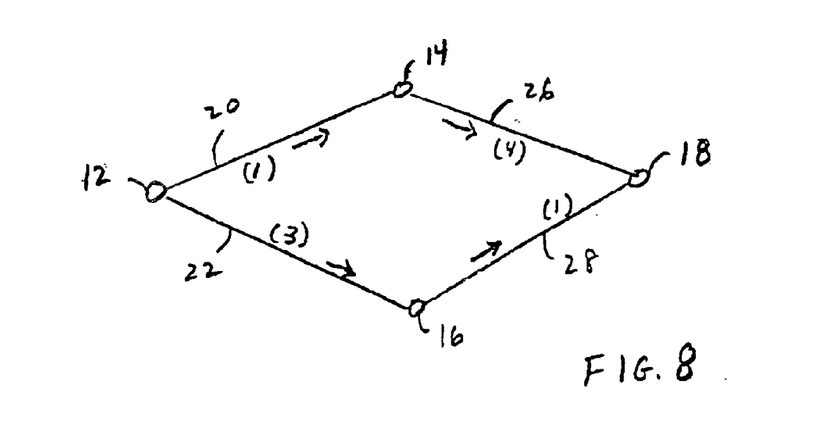
FIG. 8 illustrates a pair of paths obtained by combining the first and second routes.

Once the first and second routes (FIGS. 4C and 7) have been obtained, the first and second routes are combined 38 (see FIG. 8). By combining the first and second routes, links such as link 24 that are designated as part of both the first and second routes are eliminated from the resulting paths. That is because the link's negative weight used in connection with the augmented network cancels the link's original positive weight. As can be seen from FIG. 8, combining the first and second routes provides two non-overlapping paths connecting the initiating node 12 and the terminating node 18. One of those paths can be implemented 40 as the primary circuit for the requested communication, and the second path can be designated for use as the protection circuit.

Figure 9A:
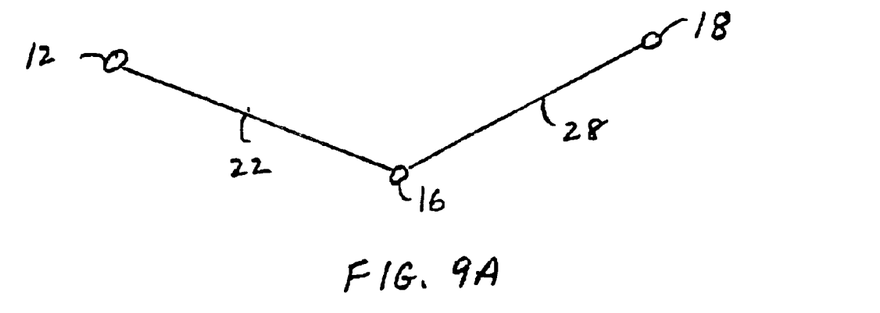
FIGS. 9A and 9B illustrate a primary circuit and a protection circuit for communications between the source node and the destination node obtained by combining the first and second routes.
Figure 9B:
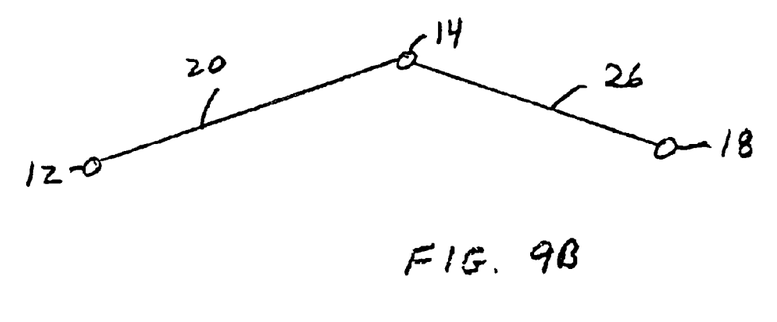

In the illustrated example, the two resulting paths in FIG. 8 have different total administrative weights. In particular, the path along links 22 and 28 through network element 16 has a total weight of four, whereas the path along links 20 and 26 through network element 14 has a total weight of five. Preferably, the path with the lesser total weight is implemented as the primary circuit for the requested communication. In the illustrated example, the path along links 22 and 28 would provide the primary circuit (FIG. 9A), and the path along links 20 and 26 would be designated for the protection circuit (FIG. 9B).

Although particular algorithms have been noted above, other algorithms also can be used to implement the technique illustrated by FIG. 3. For example, the Floyd-Warshall algorithm for obtaining a shortest path can be used.

In addition to the failure of links, a communication path also can be disrupted if a node through which it passes experiences a failure. Therefore, in some situations it is desirable to provide a protection path that not only has no links in common with the primary path, but also has no nodes in common with it.

Figure 10:
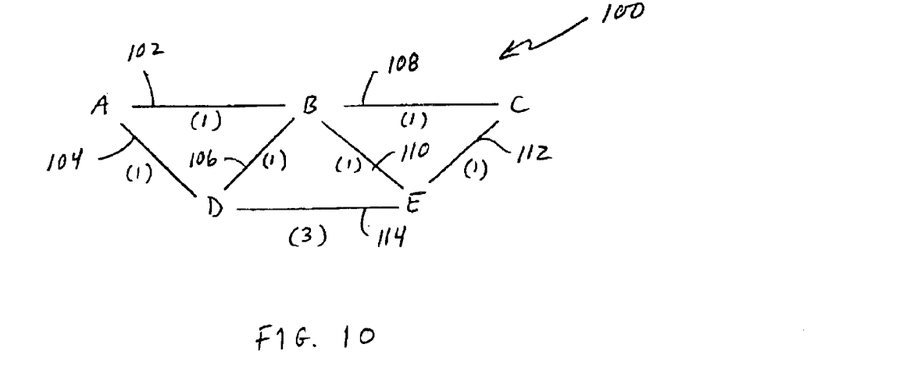
FIG. 10 illustrates another exemplary communications network.

FIG. 10 illustrates an exemplary network 100 including nodes A, B, C, D and E connected by multiple links 102, 104, 106, 108, 110. In the illustrated example, each link has an administrative weight of 1 except for the link 114, which has an administrative weight of 3. In FIG. 10, the administrative weights are shown in parentheses. If the techniques previously described are used to provision primary and protection circuits automatically between nodes A and C, then the paths ABC and ADBEC would be designated as the primary and protection circuits. In that case, node B would be included as part of both the primary and protection circuits.

A primary circuit and a corresponding protection circuit that do not share any links or nodes and that minimize the total sum of administrative weights associated with the links in the two circuits can be obtained by using a technique referred to as "node splitting." In that technique, the original network is pre-processed by considering each node to be comprised of an incoming node and an outgoing node. Each link in the original network is explicitly considered as two one-directional links, and the incoming and outgoing nodes are connected by a one-directional path from the incoming node to the outgoing node. Each link is considered as having a capacity equal to one.

Figure 11:
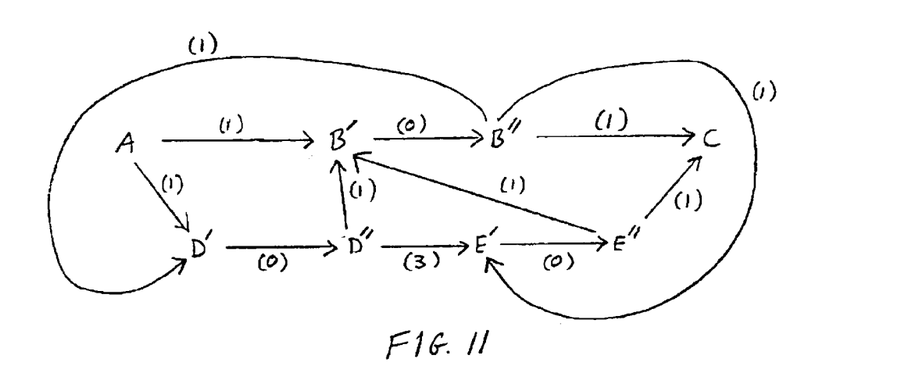
FIG. 11 illustrates a pre-processed version of the network of FIG. 10 using node-splitting.

Using node-splitting to pre-process the network 100 results in the network illustrated in FIG. 11. In other words, each node (other than the source and destination nodes A and C) is split into an incoming node and an outgoing node, with the primed letters indicating the incoming nodes and the double primed letters indicating the outgoing nodes. For example, node B is split into the incoming node B' and the outgoing node B". Each of the one-way links from an incoming node to an outgoing node is assigned an administrative weight of zero.

Once the pre-processed network of FIG. 11 is obtained, the primary and protection circuits can be obtained using techniques similar to those described above. A first route is determined between the source node A and the destination node C such that the sum of the administrative weights for the links along the route is minimized. In this case, the first route would be AB'B"C.

Figure 12:
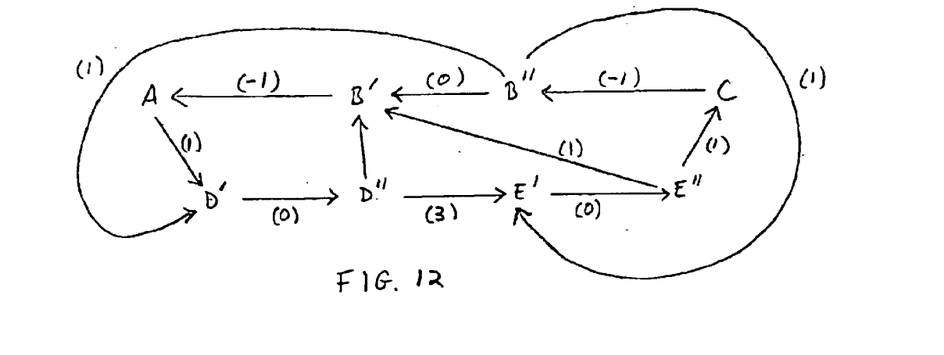
FIG. 12 illustrates an augmented network based on the network of FIG. 11.

Next, an augmented network is established by setting the administrative weight of each link along the first route to a negative value having the same amplitude as its original weight and by reversing the permitted directions of information flow along those links. Thus, the augmented network corresponding to the network in FIG. 10 would appear as shown in FIG. 12. Using the augmented network, a second route is determined between the source node A and the destination node C such that the sum of the administrative weights for the links along the route is minimized. In this case, the second route would be AD'D"E'E"C. In particular, the one-way link from node B' to node B" prevents the first and second routed from having overlapping links and overlapping nodes.

The first and second routes (AB'B"C and AD'D"E'E"C) correspond to the primary and protection circuits (ABC and ADEC). Other than the source and destination nodes (A and C), the primary and protection circuits do not share any links or nodes.

The foregoing techniques can be implemented in hardware and/or software. In one implementation, a system for implementing the techniques includes a dedicated processor including instructions for performing the functions described above. Alternatively, the system can include a general-purpose processor. Computer-executable instructions for implementing the foregoing techniques can be stored as encoded information on a computer-readable medium such as a magnetic floppy disk, magnetic tape, or compact disc read only memory (CD-ROM). Circuits also may be provided for determining primary and protection circuits according to the foregoing techniques.

Figure 13:
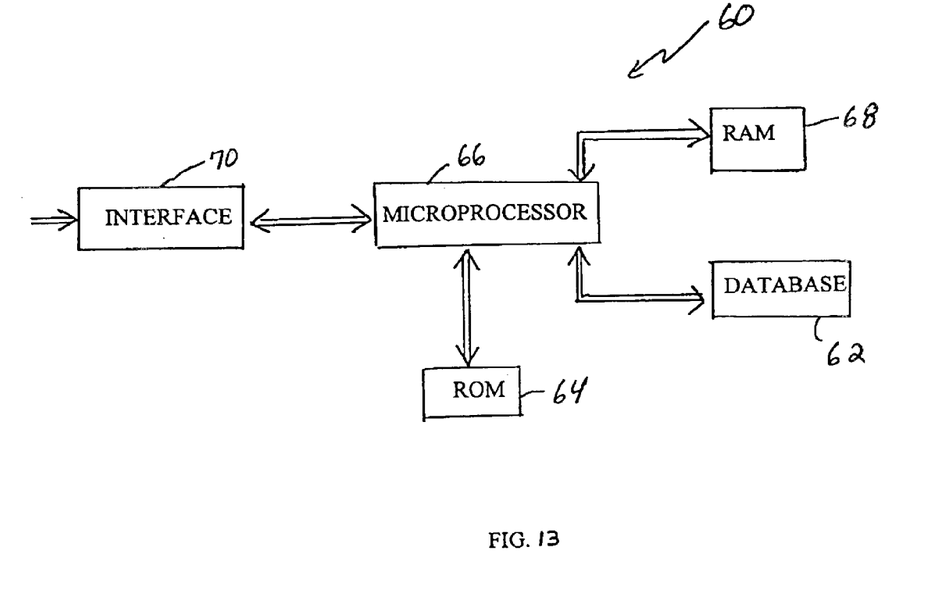
FIG. 13 is a schematic block diagram of an exemplary system for implementing the techniques of the invention.

FIG. 13 illustrates an exemplary system 60 for implementing the techniques described above. The system 60 includes a database 62 that stores information relating to the topology of the network 10. The information contained in the database 62 can include details of the fixed structures and properties of the network, including the characteristics of the links 20, 22, 24, 26, 28. A read-only memory (ROM) 64 stores computer-executable code for determining primary and protection circuits according to the techniques describe above. A microprocessor 66 receives incoming requests from network users. The microprocessor 66 executes the code stored in the ROM 64 to determine the primary and protection circuits in response to a received request to establish communications between a source node and a destination node in the network. A random access memory (RAM) 68 can be used to store the information identifying the links that form the primary and protection circuits for the requested communication. Requests from network users and information relating to assigned routes can be transmitted through one or more interfaces 70.

In one particular implementation, one of the foregoing techniques was implemented in the C computer language using a 450 MHz Pentium® III processor manufactured by the Intel Corporation. That implementation allowed primary and protection circuits to be determined for a one-hundred node network in approximately 0.6 seconds.

Although a single processor 66 is illustrated as responsible for receiving the requests to establish communications and for executing the instructions stored in the ROM 64, in some cases, multiple processors can be used for performing those functions.

An automated system for provisioning primary and protection circuits in a communications network as described above can be located either at a centralized location or can be distributed locally in the various network nodes. If the system 60 is located centrally, commands can be transmitted to the network elements instructing them how to set up the primary and protection circuits for a particular communication.

The foregoing techniques can be used to provision protection circuits automatically at various link and protocol layers and for various capacities within each protocol layer. For example, the techniques are applicable to SONET and asynchronous transfer mode (ATM) networks as well as other standard and non-standard networks. Therefore, the same technique can be used to provision protection circuits at multiple protocol levels in a multi-protocol communication system by looking at the topology of the particular protocol level under consideration.

The techniques can be used in various types of protection circuit scenarios, including 1+1 protection and 1:1 protection. In a 1+1 protection scenario, data is sent over both the primary circuit and the protection circuit. However, the receiving unit listens only to the primary circuit. Should a failure occur with respect to the primary circuit, the receiving end can switch to the protection circuit. In a 1:1 protection scenario, data is sent over the primary circuit only. The protection circuit is set up and can be used for the transmission of other data. Should a failure occur on the primary circuit, transmission of the other data is stopped and the protection circuit is used instead of the primary circuit.

Using the foregoing technique allows automated provisioning of protection circuits as well as primary circuits for a wide variety of communications networks. Furthermore, the primary and protection circuits obtained can result in a combined total administrative weight whose value is minimized with respect to the available links in the network.

Other implementations are within the scope of the claims.

What is claimed is:

1. A method of establishing communications, the method comprising:

automatically provisioning a primary circuit for communications between a first node and a second node in a communications network; and automatically provisioning a protection circuit for communications between the first node and the second node;

wherein the primary and protection circuits are provisioned in response to receiving a request to establish communications between the first and second nodes; and wherein a sum of administrative weights of all links forming the primary and protection circuits is minimized with respect to available links.

2. The method of claim 1 wherein the links forming the primary and protection circuits are non-overlapping.

3. The method of claim 2 wherein, except for the first and second nodes, the primary and protection circuits do not share any other nodes.

4. The method of claim 1 including:

determining a first route between the first and second nodes in the network so that a sum of original administrative weights associated with links along the first route is minimized with respect to available links;

establishing an augmented network corresponding to the communications network;

determining a second route between the first and second nodes based on the augmented network so that a sum of administrative weights associated with links along the second route is minimized with respect to available links; and combining the first and second routes to obtain first and second paths between the first and second nodes, wherein the first and second paths correspond to the primary protection circuits.

5. The method of claim 4 wherein augmenting the network includes:

assigning a new administrative weight for each link along the first route based on the original administrative weight corresponding to the same link; and limiting a permissible direction of communications for each link based on a direction established for that link in the first route.

6. The method of claim 5 wherein each new administrative weight has a negative value and an amplitude equal to the original administrative weight for the same link.

7. The method of claim 4 wherein combining the first and second routes includes eliminating from consideration links included in both the first and second routes.

8. The method of claim 1 including using the protection circuit for communications between the first and second nodes if a failure occurs in the primary circuit.

9. An article comprising a computer readable medium including instructions for causing a computer system to:

provision a primary circuit for communications between a first node and a second node in a communications network; and provision a protection circuit for communications between the first node and the second node;

wherein the provisioning of the primary and protection circuits occurs in response to a request to establish communications between the first and second nodes; and wherein a sum of administrative weights of all links forming the primary and protection circuits is minimized with respect to available links.

10. The article of claim 9 wherein the links forming the primary and protection circuits are non-overlapping.

11. The article of claim 10 wherein, other than the first and second nodes, the primary and protection circuits do not share any other nodes.

12. The article of claim 9 including instructions for causing the computer system to:
- determine a first route between the first and second nodes in the network so that a sum of original administrative weights associated with links along the first route is minimized with respect to available links;
- establish an augmented network corresponding to the communications network; and
- determine a second route between the first and second nodes based on the augmented network so that a sum of administrative weights associated with links along the second route is minimized with respect to available links; and
- combine the first and second routes to obtain first and second paths between the first and second nodes, wherein the first and second paths correspond to the primary and protection circuits.

13. The article of claim 12 wherein the instructions for causing the computer system to augment the network include instructions for causing the computer system to:
- assign a new administrative weight for each link along the first route based on the original administrative weight corresponding to the same link; and
- limit a permissible direction of communications for each link based on a direction established for that link in the first route.

14. The article of claim 13 wherein each new administrative weight has a negative value and an amplitude equal to the original administrative weight for the same link.

15. The article of claim 12 wherein the instructions for causing the computer system to combine the first and second routes includes instructions for causing the computer system to eliminate from consideration links included in both the first and second routes.

16. The article of claim 9 including instructions for causing the computer system to use the protection circuit for communications between the first and second nodes if a failure occurs in the primary circuit.

17. A communications system comprising:
- a plurality of nodes;
- transmission facilities connecting the nodes;
- a database storing information regarding characteristics of the transmission facilities;
- memory storing instructions to:
  - provision a primary circuit for communications between a first node and a second node in the network; and
  - provision a protection circuit for communications between the first node and the second node; and
- a processor for executing the instructions in response to a request to establish communications between the first and second nodes;

wherein a sum of administrative weights of all transmission facilities forming the primary and protection circuits is minimized with respect to available links.

18. The system of claim 17 wherein the system comprises a plurality of protocol levels and wherein the processor can execute the instructions with respect to any of the protocol levels.

19. The system of claim 17 wherein the transmission facilities forming the primary and protection circuits are non-overlapping.

20. The system of claim 19 wherein, other than the first and second nodes, the primary and protection circuits do not share any other nodes.

21. The system of claim 17 wherein the memory includes instructions to:
- determine a first route between the first and second nodes in the network so that a sum of original administrative weights associated with transmission facilities along the first route is minimized with respect to available links;
- establish an augmented network corresponding to the communications network; and
- determine a second route between the first and second nodes based on the augmented network so that a sum of administrative weights associated with transmission facilities along the second route is minimized with respect to available links; and
- combine the first and second routes to obtain first and second paths between the first and second nodes, wherein the first and second paths correspond to the primary and protection circuits.

22. The system of claim 21 wherein the instructions augment the network include instructions to:
- assign a new administrative weight for each transmission facility along the first route based on the original administrative weight corresponding to the same transmission facility; and
- limit a permissible direction of communications for each transmission facility based on a direction established for that transmission facility in the first route.

23. The system of claim 22 wherein each new administrative weight has a negative value and an amplitude equal to the original administrative weight for the same transmission facility.

24. The system of claim 17 wherein the instructions to combine the first and second routes includes instructions to eliminate from consideration transmission facilities included in both the first and second routes.

25. The system of claim 17 wherein the memory includes instructions to use the protection circuit for communications between the first and second nodes if a failure occurs in the primary circuit.

* * * * *